United States Patent
Kundu et al.

(10) Patent No.: US 10,397,347 B2
(45) Date of Patent: Aug. 27, 2019

(54) GEOLOCATION-BASED ACTIVATION AND DE-ACTIVATION OF HARDWARE AND SOFTWARE FUNCTIONALITIES IN THE CLOUD

(71) Applicant: International Business Machines Corporation, Armonk, NY (US)

(72) Inventors: Ashish Kundu, Elmsford, NY (US); Dimitrios Pendarakis, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 15/396,895

(22) Filed: Jan. 3, 2017

(65) Prior Publication Data

US 2018/0191844 A1    Jul. 5, 2018

(51) Int. Cl.
*H04L 29/08*      (2006.01)
*G06F 9/50*       (2006.01)
*H04L 12/911*     (2013.01)
*G06F 16/215*     (2019.01)
*G06F 16/9537*    (2019.01)
*H04W 4/021*      (2018.01)
(Continued)

(52) U.S. Cl.
CPC ............ *H04L 67/18* (2013.01); *G06F 9/5077* (2013.01); *G06F 16/215* (2019.01); *G06F 16/9537* (2019.01); *H04L 47/82* (2013.01); *H04W 4/021* (2013.01)

(58) Field of Classification Search
CPC .......................... H04L 63/20; H04L 67/1014; H04L 63/0263; H04L 63/0272; H04L 63/101; H04L 63/10; H04L 67/1021; G06F 9/5088; G06F 9/45533; G06F 11/3055; G06F 21/00; G06F 2009/4557; G06F 9/4856; G06F 9/5077; H04W 12/00; H04W 72/048
USPC ................. 726/1, 21, 27; 709/223, 225, 226
See application file for complete search history.

(56) References Cited

U.S. PATENT DOCUMENTS 7,096,256 B1 *  8/2006  Shafer ................. H04L 41/0893
                                                    709/220
7,949,637 B1 *  5/2011  Burke ..................... G06F 3/0605
                                                    707/655

(Continued)

OTHER PUBLICATIONS

P. Mell et al., "The NIST Definition of Cloud Computing", National Institute of Standards and Technology, Information Technology Laboratory, Sep. 2011, pp. 1-7.

*Primary Examiner* — Backhean Tiv
*Assistant Examiner* — Linh T. Nguyen
(74) *Attorney, Agent, or Firm* — Law Office of Jim Boice

(57) ABSTRACT

A method, system and/or computer program product alters a computer resource while in a particular geolocation of a cloud computing environment. One or more processors detect that a geolocation of a computer resource has changed to a first geolocation within a cloud computing environment. In response to detecting that the geolocation of the computer resource has changed to the first geolocation within the cloud computing environment, the processor(s) retrieve a set of geolocation based resource policies for the first geolocation. The processor(s) then apply a selected set of one or more geolocation based resource policies from the set of geolocation based resource policies to alter the computer resource while in the first geolocation.

20 Claims, 5 Drawing Sheets

(51) Int. Cl.
*G06F 9/455* (2018.01)
*G06F 15/173* (2006.01)

(56) References Cited

U.S. PATENT DOCUMENTS

| | | | |
|---|---|---|---|
| 2007/0250410 A1* | 10/2007 | Brignone | G06Q 10/087 |
| | | | 705/28 |
| 2008/0104393 A1* | 5/2008 | Glasser | G06F 17/30575 |
| | | | 713/165 |
| 2008/0134177 A1* | 6/2008 | Fitzgerald | G06F 21/51 |
| | | | 718/1 |
| 2009/0172689 A1* | 7/2009 | Bobak | G06F 9/5061 |
| | | | 718/104 |
| 2010/0054129 A1* | 3/2010 | Kuik et al. | H04L 12/24 |
| | | | 370/235 |
| 2010/0250744 A1* | 9/2010 | Hadad et al. | G06F 15/16 |
| | | | 709/226 |
| 2012/0042311 A1* | 2/2012 | Biran | G06F 9/45558 |
| | | | 718/1 |
| 2012/0331527 A1 | 12/2012 | Walters et al. | |
| 2013/0066980 A1 | 3/2013 | Vasters | |
| 2013/0117801 A1* | 5/2013 | Shieh | H04L 63/0209 |
| | | | 726/1 |
| 2014/0173620 A1* | 6/2014 | Chai | G06F 9/5005 |
| | | | 718/104 |
| 2016/0014648 A1 | 1/2016 | Hamilton et al. | |
| 2016/0119342 A1* | 4/2016 | Kus | H04L 63/0876 |
| | | | 713/154 |
| 2016/0299818 A1* | 10/2016 | Vijayan | G06F 11/1453 |
| 2017/0132401 A1* | 5/2017 | Gopi | G06F 21/34 |
| 2018/0013791 A1* | 1/2018 | Healy et al. | H04L 29/06 |

\* cited by examiner

GEOLOCATION-BASED ACTIVATION AND DE-ACTIVATION OF HARDWARE AND SOFTWARE FUNCTIONALITIES IN THE CLOUD

BACKGROUND

The present disclosure relates to the field of computing devices, and specifically to computer resources utilized by computing devices. More specifically, the present disclosure relates to modifying a computer resource in response to a geophysical movement of the computer resource within a cloud computing environment.

SUMMARY

A method alters a computer resource while in a particular geolocation of a cloud computing environment. One or more processors detect that a geolocation of a computer resource has changed to a first geolocation within a cloud computing environment. In response to detecting that the geolocation of the computer resource has changed to the first geolocation within the cloud computing environment, the processor(s) retrieve a set of geolocation based resource policies for the first geolocation. The processor(s) then apply a selected set of one or more geolocation based resource policies from the set of geolocation based resource policies to alter the computer resource while in the first geolocation.

The present invention may also be implemented in a computer program product and/or a computer system.

DETAILED DESCRIPTION

Figure 1:
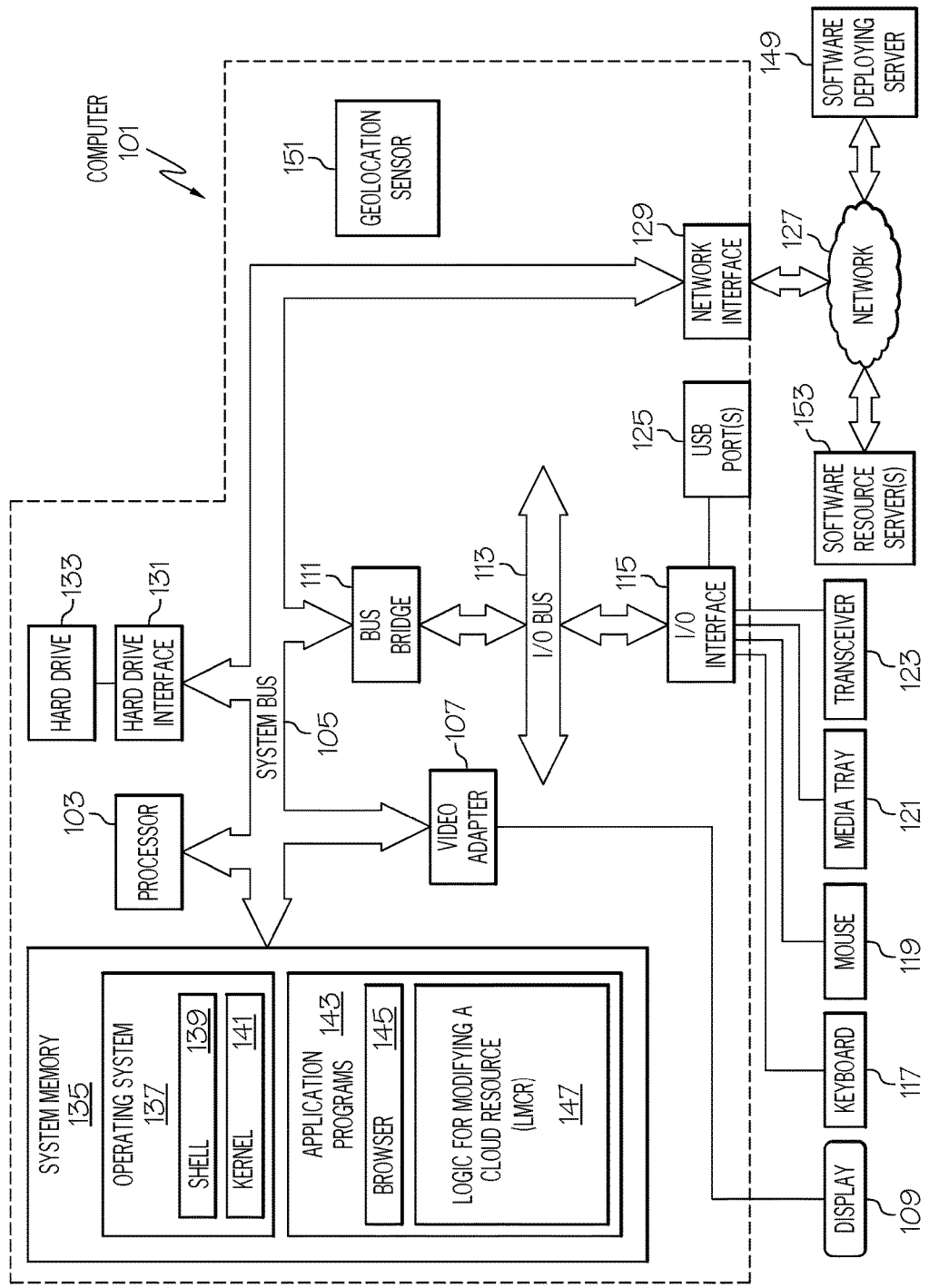
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or software resource server(s) 153 shown in FIG. 1 and/or the managing computer 201 shown in FIG. 2.

Exemplary computer 101 includes a processor 103 that is coupled to a system bus 105. Processor 103 may utilize one or more processors, each of which has one or more processor cores. A video adapter 107, which drives/supports a display 109 (which in one or more embodiments of the present invention is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Modifying a Cloud Resource (LMCR) 147. LMCR 147 includes code for implementing the processes described below, including those described in FIGS. 2-3. In one embodiment, computer 101 is able to download LMCR 147 from software deploying server 149, including in an on-demand basis, wherein the code in LMCR 147 is not downloaded until needed for execution. In one embodiment of the present invention, software deploying server 149 performs all of the functions associated with the present invention (including execution of LMCR 147), thus freeing computer 101 from having to use its own internal computing resources to execute LMCR 147.

Also within computer 101 is a geolocation sensor 151, which is able to detect the physical location of computer 101 and/or the orientation of computer 101. For example, geolocation sensor 151 may incorporate global positioning system (GPS) sensors that identify the geophysical location of computer 101 using signals from an array of space-based GPS satellites. Furthermore, location and positioning sensor 151 may identify a static IP address of computer 101, which can be mapped to a physical location.

Also in communication with computer 101 are software resource server(s) 153, which are hardware servers capable of serving (supplying) applications, databases, electronic files (e.g., text files, video files, audio files, etc.), virtual machines, etc. from a cloud-based system.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

The terms "location", "geophysical location", and "geolocation" are used interchangeably herein to describe a physical location of an object, such as a software resource stored on a storage device.

In one or more embodiments, the present invention is implemented in a cloud environment. Although defined in greater detail below, "the cloud" is understood to be an Internet-based set of hardware and software that provide processing resources in a shared on-demand manner. That is, the cloud is a set of hardware and/or software that is deployed to a requester in real time and in an on-demand basis. Such resources are in remote physical locations that are generally hidden from the end user, and afford optimal security and scalability with minimal overhead to the end user. However, the actual resources and/or their geophysical locations are known to a cloud managing computer.

As described herein, the present invention provides a solution to appropriately modifying a computer resource that has moved to a different geophysical location within the cloud.

For example, a software resource (e.g., a text file, a database file, an audio file, a video file, a virtual machine (i.e., software that emulates a physical machine), etc.) may move from one physical location in the cloud to another location in the cloud (e.g., from one data center to another data center, from one server blade to another server blade, from one country to another country, etc.). This movement (i.e., "migration") may be physical (e.g., physically moving a storage drive from one physical location to another physical location) or electronic (e.g., transmitting the file over a network from one physical location to another physical location).

Similarly, a hardware resource (e.g., a processor, a storage device, a memory, a router, etc.) may be physically moved from one physical location to another physical location within the cloud.

When such a movement/migration occurs, there may be a problem with the new geolocation. For example, assume that an electronic medical record (EMR) file for a patient is stored in a first country that has no regulations regarding storage/sharing of EMR files (i.e., the EMR can be stored anywhere and shared with anyone). Assume further that a second country has very strict regulations regarding how the EMR is stored (e.g., encrypted, behind a firewall, etc.) and shared (e.g., with only predefined designated accessing parties). Thus, if an unencrypted/unsecured EMR is sent from the first country (where such EMRs are permissible) to the second country (where such EMRs are not permissible), then there is a problem. The present invention provides a solution to this problem.

Figure 2:
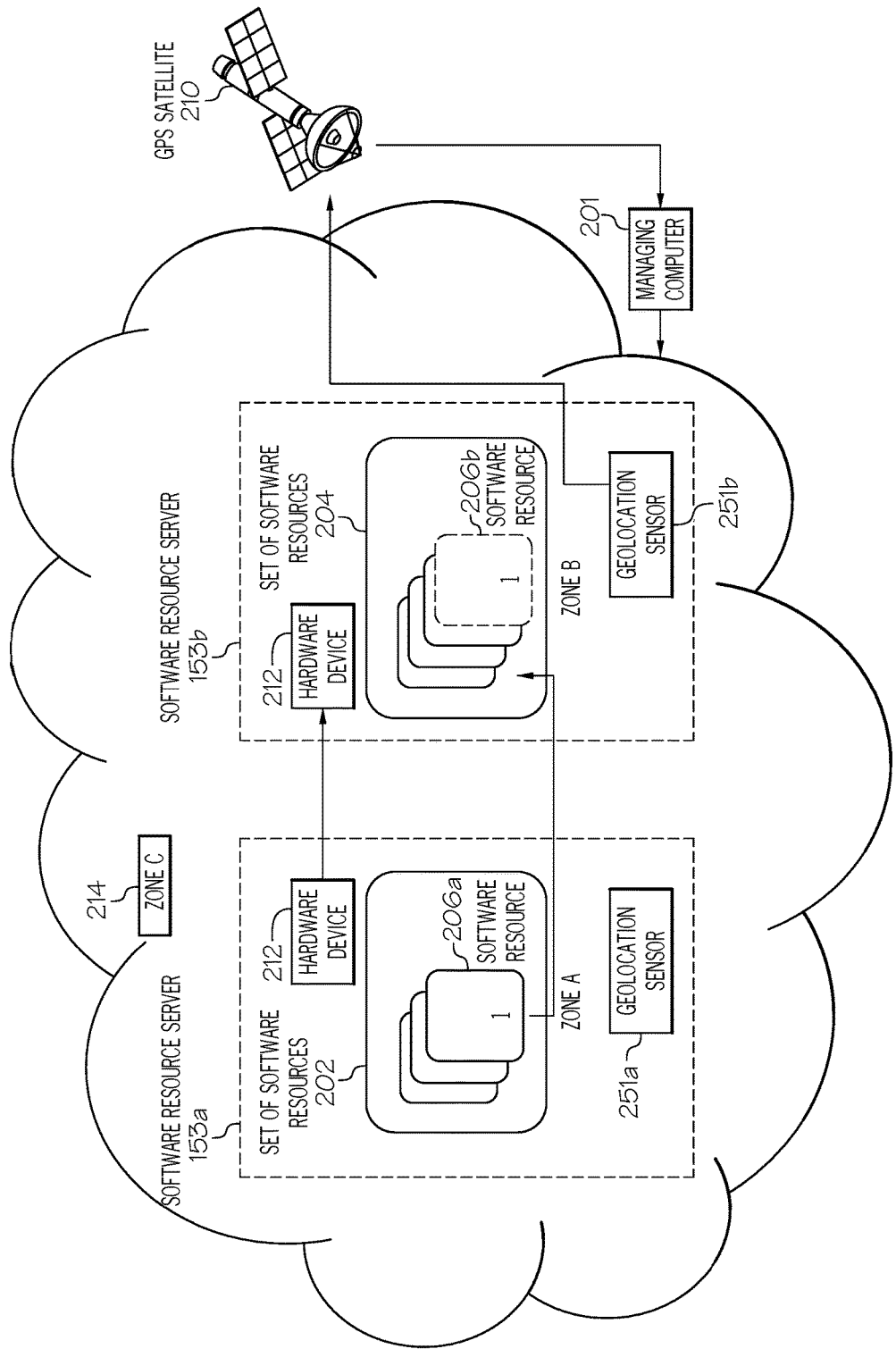
FIG. 2 illustrates a computer resource being relocated to a new geophysical location within a cloud in accordance with one or more embodiments of the present invention.

With reference now to FIG. 2, assume that a cloud 200 contains cloud resources, such as those shown within a software resource server 153*a* (analogous to one of the software resource server(s) 153 shown in FIG. 1), which contains (stores) a set of software resources 202, such as the depicted set of data files, as well as hardware resource(s) such as hardware resource 212. The software resource server 153*a* is located in Zone A, which is a first geophysical location within cloud 200. In one or more embodiments, the first geophysical location is determined by readings from a geolocation sensor 251*a* (analogous to geolocation sensor 151 shown in FIG. 1).

Assume now that one of the set of software resources 202 (i.e., software resource 206*a*) is migrated (copied and/or moved) to a second software resource server 153*b* (also analogous to one of the software resource server(s) 153 shown in FIG. 1) within Zone B (a second geophysical location within cloud 200 that is identified by geolocation sensor 251*b*, which is also analogous to geolocation sensor 151 shown in FIG. 1). This migration results in software resource 206*a* (now depicted as software resource 206*b*) residing within the software resource server 153*b* in Zone B.

In one embodiment, software resource 206*a* and software resource 206*b* are a same copy of a same resource. That is, in this embodiment software resource 206*a* moves from software resource server 153*a* to software resource server 153*b*, such that software resource 206*a* no longer resides within the software resource server 153*a*.

In one embodiment, software resource 206*a* and software resource 206*b* are different copies of a same resource. That is, in this embodiment a copy of software resource 206*a* (software resource 206*b*) is stored in software resource server 153*b*, such that software resource 206*a* is retained within the software resource server 153*a*.

While the computer resource being migrated may be a software resource (e.g., software resource 206*a*/206*b*), the computer resource being migrated may be a hardware resource, such as hardware resource 212. That is, hardware resource 212 may be physically moved from Zone A to Zone B within cloud 200. Examples of hardware resource 212 include, but are not limited to, a processor, a storage device, a memory, a router, an input/output (I/O) interface, a modem, etc.

The present invention presents various methods for determining whether or not the software resource 206*a* has migrated from software resource server 153*a* to software resource server 153*b* (i.e., has migrated from Zone A to Zone B), and/or whether hardware device 212 has been moved from Zone A to Zone B.

In one embodiment of the present invention, the locations of software resource server 153*a* and software resource server 153*b* are determined by static internet protocol (IP) addresses assigned to software resource server 153*a* and software resource server 153*b*. That is, software resource server 153*a* is assigned IP address "A", while software resource server 153*b* is assigned IP address "B". A table shows that IP address "A" is reserved for Zone A, while IP address "B" is reserved for Zone B. Thus, any communication with software resource 206*a* (or hardware device 212 while in Zone A) via the Internet will be via IP address "A", which is known to be restricted to Zone A (thus identifying the physical location of software resource 206*a* and/or hardware device 212). Similarly, any communication with software resource 206*b* (or hardware device 212 while in Zone B) via the Internet will be via IP address "B", which is known to be restricted to Zone B (thus identifying the physical location of software resource 206*b* and/or hardware device 212).

In one embodiment of the present invention, the locations of software resource server 153*a* and software resource server 153*b* are determined by a global positioning system (GPS) satellite 210 interrogating and validating geolocation sensors 251*a*-251*b* (when architected as GPS positioning sensors). That is, GPS satellite 210 determines the geophysical location of geolocation sensor 251*a* and geolocation sensor 251*b*. However, geolocation sensor 251*b* could be a "fake" geolocation sensor that has been programmed to generate a false location signal.

For example, assume that geolocation sensor 251*b* has been nefariously replaced with a "fake" geolocation sensor, which outputs a location signal that reports, regardless of what GPS signal is being sent from GPS satellite 210, that software resource server 153*b* is currently in Zone A (rather than accurately reporting that software resource server 153*b* is currently in Zone B). However, the original geolocation sensor 251*b* within software resource server 153*b* was registered (e.g., using a uniform universal identifier—UUID) with the managing computer 201, such that managing computer 201 only accepts GPS readings from the registered original geolocation sensor 251*b*, not the nefarious replacement for geolocation sensor 251*b*. If the managing computer 201 receives a GPS signal from the nefarious replacement geolocation sensor, then managing computer 201 will assume that the software resource server 153*b* and software resource 206*b* are in Zone B (or some other zone other than Zone A), regardless of what geolocation signal is being received from the replacement geolocation sensor.

Once a determination is made that the software resource 206*a*/206*b* and/or hardware device 212 has moved from Zone A to Zone B, various modifications/actions can be taken on software resource 206*b* and/or hardware device 212.

For example and in one embodiment of the present invention, in response to determining that software resource 206*b* is in Zone B, managing computer 201 (through whom all requests for software resource 206*b* are handled) will refuse to provide software resource 206*b* to the requester.

In another embodiment of the present invention, in response to determining that software resource 206*b* is in Zone B, managing computer 201 will modify software resource 206*b* before sending it to the requester. For example, if software resource 206*b* is an electronic medical record (EMR), then managing computer 201 may redact certain privileged/sensitive data from the EMR before sending it to the requester.

In another embodiment of the present invention, assume that the software resource 206*b* is a virtual machine, and Zone B only has resources capable of supporting a certain version of the virtual machine. In this scenario, the virtual machine will be modified accordingly by the managing computer 201. For example, within Zone B there may be fewer processors, less storage space, etc. than are available within Zone A. As such, the virtual machine will be modified to be less powerful in Zone B (e.g., has less bandwidth, is capable of executing fewer instructions per second, etc.) than it was when configured for Zone A.

Figure 3:
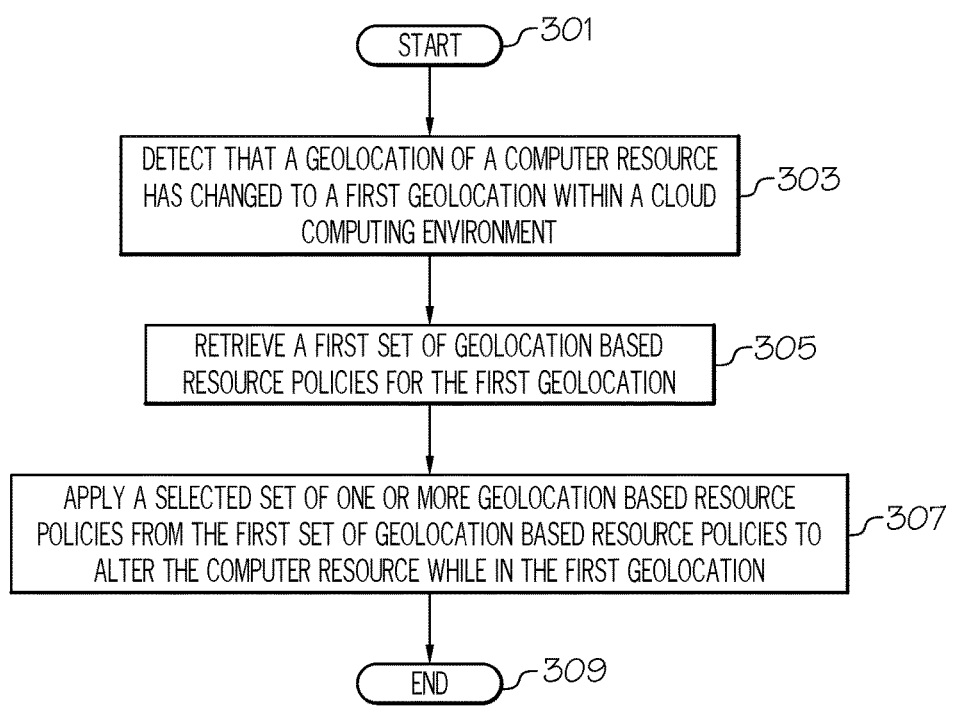
FIG. 3 is a high-level flow chart of one or more steps performed by one or more processors and/or other hardware devices to modify a computer resource that has been moved to a new geolocation.

With reference now to FIG. 3, a high-level flow chart of one or more steps performed by one or more processors and/or other hardware devices to modify a computer resource that has been moved to a new geolocation is presented.

After initiator block 301, one or more processors (e.g., within managing computer 201 shown in FIG. 2) detect that a geolocation of a computer resource (e.g., software resource 206*b*) has changed to a new/first geolocation (e.g., Zone B) within a cloud computing environment (e.g., cloud 200 shown in FIG. 2), as depicted in FIG. 2 and described in block 303 in FIG. 3.

As described herein, in one embodiment of the present invention the new geolocation is detected by a global positioning system (GPS) sensor (e.g., geolocation sensor 251*b* shown in FIG. 2) that is in communication with a GPS satellite (e.g., GPS satellite 210 shown in FIG. 2), where the GPS sensor is a component of a software resource server (e.g., software resource server 153*b* shown in FIG. 2) that contains the software resource.

As described herein, in one embodiment of the present invention the GPS sensor is authenticated by a managing computer (e.g., managing computer 201 shown in FIG. 2) that detects the geolocation of the software resource server by using GPS sensor readings from the GPS sensor. In an embodiment of the present invention, if the managing computer 201 does not authenticate the geolocation sensor 251*b* (i.e., the GPS sensor in the software resource server 153*b*), then it will refuse to allow access to the software resource 206*b*, will modify the software resource 206*b*, etc.

As described in block 305, in response to detecting that the geolocation of the computer resource has changed to the first geolocation within the cloud computing environment, the processor(s) retrieve a first set of geolocation based resource policies for the first geolocation within the cloud computing environment.

In an embodiment of the present invention, the first set of geolocation based resource polices includes an export control policy. For example, assume that software resource 206*a* shown in FIG. 2 is prohibited from being exported to Zone B, due to national security regulations, secrecy acts, etc. (e.g., including those promulgated by a government, enterprise, etc. within Zone A). Similarly, assume that hardware device 212 shown in FIG. 2 is prohibited from being exported to Zone B, due to national security regulations, secrecy acts, etc. All such security regulations, secrecy acts, etc. are examples of a basis for the export control policy.

In an embodiment of the present invention, the first set of geolocation based resource policies includes a whitelist specifying features of the first resource to be enabled while in the first geolocation (e.g., Zone B shown in FIG. 2) within the cloud computing environment. For example, assume that hardware device 212 is moved to Zone B, and that hardware device 212 is a multi-core processor. While in Zone B, hardware device 212 is authorized to activate certain cores (e.g., those relegated to graphic processing). Thus, while in Zone B, the graphics cores are activated in accordance with the whitelist.

In an embodiment of the present invention, the first set of geolocation based resource policies includes a blacklist specifying features of the first resource to be deactivated while in the first geolocation (e.g., Zone B shown in FIG. 2) within the cloud computing environment. For example, assume that hardware device 212 is moved to Zone B, and that hardware device is a multi-core processor. While in Zone B, hardware device is not authorized to activate certain cores (e.g., those relegated to decryption processing). Thus, while in Zone B, the decryption cores are deactivated in accordance with the blacklist.

Returning to FIG. 3 and as described in block 307, the processor(s) than apply a selected set of one or more geolocation based resource policies from the first set of geolocation based resource policies to alter the computer resource while in the first geolocation within the cloud computing environment. That is, the first set of geolocation based resource policies are specific for the first geolocation (e.g., Zone B shown in FIG. 2) within the cloud computing environment (e.g., cloud 200), and are thus applied accordingly.

The flow chart ends at terminator block 307.

In an embodiment of the present invention, the computer resource is an electronic database, such that applying the geolocation based resource policy deletes at least a portion of data in the electronic database. For example, assume that the electronic database is in a restricted zone. As such, the processor(s) will delete any sensitive data (due to enterprise policies, regulations, laws, etc.) that are not permitted to be electronically stored within that restricted zone. Alternatively, such sensitive data may be encrypted by the processor(s).

In an embodiment of the present invention, if the computer resource has been moved, then the managing computer will track the identity of anyone who attempts to retrieve it after it has been moved. That is, in an embodiment of the present invention the computer resource is an electronic database in a database server, such that applying the geolocation based resource policy causes the database server to: capture an identity of a requester of data from the electronic database; block access by the requester to the electronic database; and report the identity of the requester to a security management system.

In an embodiment of the present invention and as described herein, the computer resource is a virtual machine (VM), and applying the geolocation based resource policy reduces a functionality of the VM (i.e., reduces its bandwidth, decreases the instructions per second that it can process, etc. based on available supporting resources in the new location).

In an embodiment of the present invention, the computer resource is an application, and applying the geolocation based resource policy reduces a functionality of the application. For example, if the application has features A, B, and C while maintained within Zone A shown in FIG. 2, it may be modified to only have the features of A and C while within Zone B. For example, assume that the software resource 206a/206b shown in FIG. 2 is a controller for a petrochemical refinery. While in Zone A, software resource 206a will be able to control all actuators, fire up all furnaces, etc., as well as report conditions within a petrochemical refinery. However, while in Zone B, software resource 206b will only be able to report conditions within the petrochemical refinery, and will not be able to control actuators, furnaces, etc.

In an embodiment of the present invention, the computer resource is a database in a database server, and applying the geolocation based resource policy causes the database server to: delete an unauthorized portion of the database, where the unauthorized portion has been predetermined to be unauthorized to be stored at the new geolocation; and retain an authorized portion of the database, where the authorized portion has been predetermined to be authorized to be stored at the new geolocation. For example, when software resource 206a moves to Zone B (thus becoming software resource 206b), some of the data will remain within software resource 206b while other data within software resource 206a will be deleted from software resource 206b.

In an embodiment of the present invention, the computer resource is an electronic database, the geolocation based resource policy defines a state of availability for the data from the electronic database based on a current geolocation, and the state of availability is from a group consisting of the data being unencrypted, the data being encrypted, and the data being unavailable in any form. That is, based on where the computer resource (e.g., data) has been migrated to, that data may remain unencrypted, may be encrypted, or may be blocked from access at all, depending on the location at which it is currently residing (after migration).

In an embodiment of the present invention, the computer resource is a hardware device (e.g., hardware device 212 shown in FIG. 2), and the method further includes the one or more processors receiving the first geolocation (e.g., Zone B) of the computer resource (e.g., hardware device 212) within the cloud computing environment (cloud 200) from a geolocation sensing system (e.g., geolocation sensor 251b) associated with the hardware device. For example, geolocation sensor 251b may be a GPS sensor chip that is embedded within hardware device 212.

In an embodiment of the present invention, the computer resource is a software resource (e.g., an application, software to construct a virtual machine, a database, etc.), and the method further includes the processor(s) receiving the first geolocation (e.g., Zone B) of the computer resource within the cloud computing environment from a geolocation sensing system (e.g., geolocation sensor 251b) associated with the software resource. For example, geolocation sensor 251b may be a component of software resource server 153b, which identifies the location of all software, hardware, etc. within the software resource server 153b.

In an embodiment of the present invention, the computer resource may move/migrate a second time. For example, software resource 206b and/or hardware device 212 may subsequently be moved out of Zone B into Zone C (identified as element 214 in FIG. 2), which has its own set of geolocation based resource policies. Thus, in an embodiment of the present invention, one or more processors detect that a geolocation of a computer resource has changed from the first geolocation (e.g., Zone B) within the cloud computing environment to a second geolocation (e.g., Zone C) within the cloud computing environment; in response to detecting that the geolocation of the computer resource has changed to the second geolocation within the cloud computing environment, the processor(s) retrieve a second set of geolocation based resource policies for the second geolocation; and the processor(s) then apply a selected set of one or more geolocation based resource policies from the second set of geolocation based resource policies to alter the computer resource while in the second geolocation.

As described herein, the present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
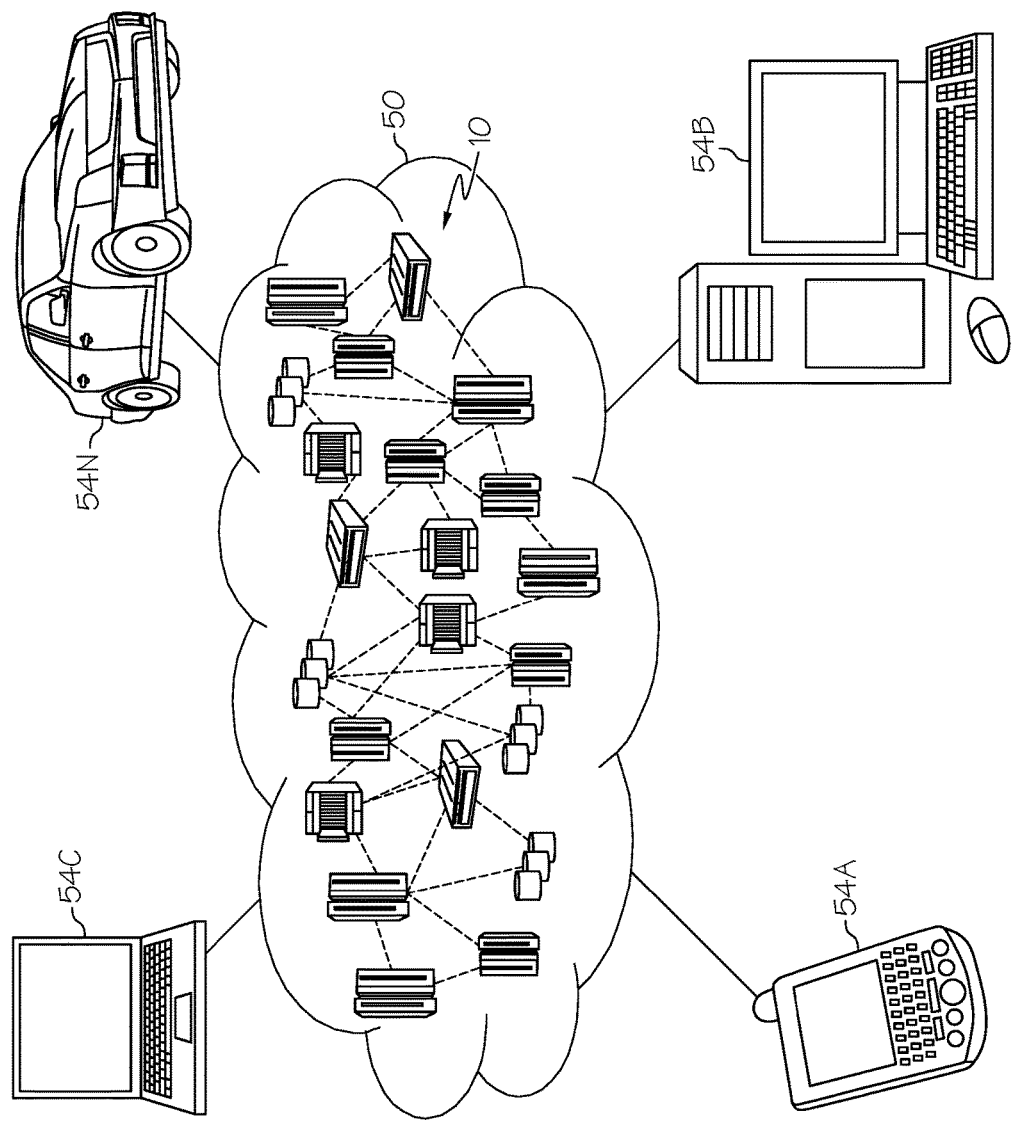
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 4 are intended to be illustrative only and that computing nodes 10 and cloud computing environment 50 can communicate with any type of computerized device over any type of network and/or network addressable connection (e.g., using a web browser).

Figure 5:
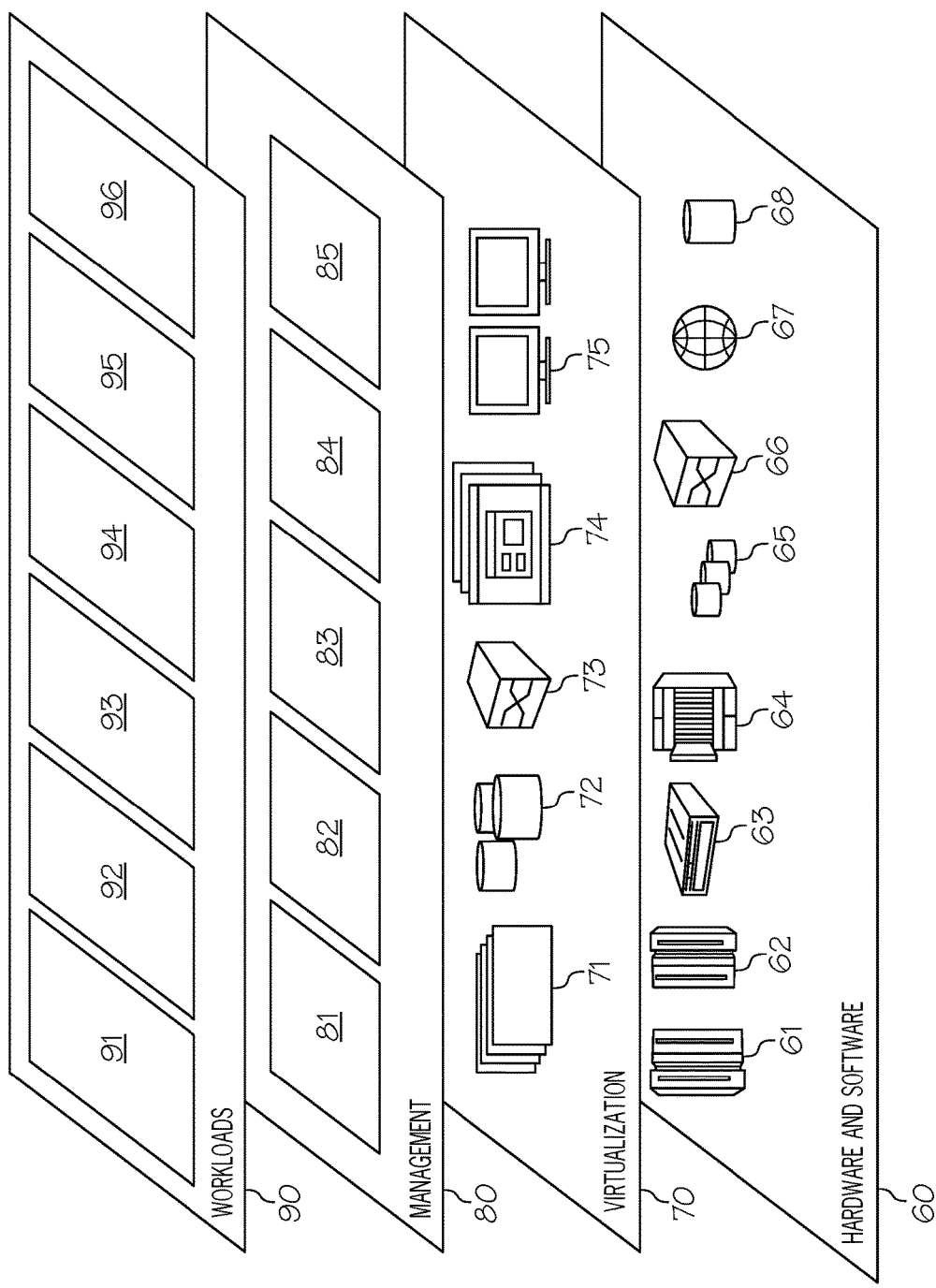
FIG. 5 depicts abstraction model layers of a cloud computer environment according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computer resource modification processing 96 to modify a computer resource that has been moved to a new geolocation in accordance with one or more embodiments of the present invention as described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   detecting, by a managing computer, that a geolocation of a computer resource has changed from an initial geolocation to a first geolocation within a cloud computing environment, wherein the first geolocation of the computer resource is determined by the managing computer based on location readings provided by a geolocation sensor;
   in response to detecting that the geolocation of the computer resource has changed from the initial geolocation to the first geolocation within the cloud computing environment, retrieving, by the managing computer, a first set of geolocation based resource policies for the first geolocation within the cloud computing environment, wherein the computer resource, when located in the initial geolocation, is controlled by an initial set of geolocation based resource policies that is different from the first set of geolocation based resource policies;
   applying, by the managing computer, a selected set of one or more geolocation based resource policies from the first set of geolocation based resource policies to alter the computer resource while in the first geolocation within the cloud computing environment;
   determining, by the managing computer, that the geolocation sensor is a fake geolocation sensor that is not registered with the managing computer; and
   in response to determining that the geolocation sensor is a fake geolocation sensor that is not registered with the managing computer, blocking, by the managing computer, access to the computer resource by a requesting entity.

2. The method of claim 1, wherein the first set of geolocation based resource policies comprises an export control policy that controls what types of data are permitted to be exported to the first geolocation.

3. The method of claim 1, wherein the first set of geolocation based resource policies comprises a whitelist specifying features of the first resource to be enabled while in the first geolocation within the cloud computing environment.

4. The method of claim 1, wherein the first set of geolocation based resource policies comprises a blacklist specifying features of the first resource to be deactivated while in the first geolocation within the cloud computing environment.

5. The method of claim 1, wherein the computer resource is an electronic database, and wherein applying the selected set of one or more geolocation based resource policies deletes at least a portion of data in the electronic database.

6. The method of claim 1, wherein the computer resource is an electronic database, and wherein applying selected set of one or more geolocation based resource policies encrypts at least a portion of data in the electronic database.

7. The method of claim 1, wherein the computer resource is an electronic database in a database server, and wherein applying the selected set of one or more geolocation based resource policies causes the database server to:
   capture an identity of a requester of data from the electronic database;
   block access by the requester to the electronic database; and
   report the identity of the requester to a security management system.

8. The method of claim 1, wherein the computer resource is a virtual machine (VM), and wherein applying the selected set of one or more geolocation based resource policies reduces a functionality of the VM by reducing a quantity of processors and storage space available to the VM due to fewer processors and storage space being available in the first geolocation as compared to the initial geolocation.

9. The method of claim 1, wherein the computer resource is an application, wherein the application is capable of controlling mechanical equipment while the application is at the initial geolocation, and wherein applying the selected set of one or more geolocation based resource policies reduces a functionality of the application by preventing the application from controlling mechanical equipment while the application is at the first geolocation.

10. The method of claim 1, wherein the computer resource is a database in a database server, and wherein applying the selected set of one or more geolocation based resource policies causes the database server to:
delete an unauthorized portion of the database, wherein the unauthorized portion has been predetermined to be unauthorized to be stored at the first geolocation; and
retain an authorized portion of the database, wherein the authorized portion has been predetermined to be authorized to be stored at the first geolocation.

11. The method of claim 1, wherein the computer resource is an electronic database, wherein the selected set of one or more geolocation based resource policies defines a state of availability for the data from the electronic database based on a current geolocation, and wherein the state of availability is from a group consisting of the data being unencrypted, the data being encrypted, and the data being unavailable in any form.

12. The method of claim 1, wherein the computer resource is a hardware device, and wherein the method further comprises:
receiving, by the managing computer, the first geolocation of the computer resource within the cloud computing environment from a geolocation sensing system associated with the hardware device.

13. The method of claim 1, wherein the computer resource is a software resource, and wherein the method further comprises:
receiving, by the managing computer, the first geolocation of the computer resource within the cloud computing environment, from a geolocation sensing system associated with the software resource.

14. The method of claim 1, further comprising:
detecting, by the managing computer, that a geolocation of a computer resource has changed from the first geolocation within the cloud computing environment to a second geolocation within the cloud computing environment;
in response to detecting that the geolocation of the computer resource has changed to the second geolocation within the cloud computing environment, retrieving, by the managing computer, a second set of geolocation based resource policies for the second geolocation; and
applying, by the managing computer, a selected set of one or more geolocation based resource policies from the second set of geolocation based resource policies to alter the computer resource while in the second geolocation.

15. A computer program product comprising one or more computer readable storage mediums, and program instructions stored on at least one of the one or more computer readable storage mediums, the stored program instructions comprising:
program instructions to detect that a geolocation of a computer resource has changed from an initial geolocation to a first geolocation within a cloud computing environment;
program instructions to, in response to detecting that the geolocation of the computer resource has changed from the initial geolocation to the first geolocation within the cloud computing environment, retrieve a first set of geolocation based resource policies for the first geolocation within the cloud computing environment, wherein the computer resource, when located in the initial geolocation, is controlled by an initial set of geolocation based resource policies that is different from the first set of geolocation based resource policies;
program instructions to apply a selected set of one or more geolocation based resource policies from the first set of geolocation based resource policies to alter the computer resource while in the first geolocation within the cloud computing environment;
program instructions to determine that the geolocation sensor is a fake geolocation sensor that is not registered with the managing computer; and
program instructions to, in response to determining that the geolocation sensor is a fake geolocation sensor that is not registered with the managing computer, block access to the computer resource by a requesting entity.

16. The computer program product of claim 15, wherein the computer resource is an electronic database, and wherein applying the selected set of one or more geolocation based resource policies deletes at least a portion of data in the electronic database.

17. The method of claim 1, wherein the first resource is a multi-core processor, and wherein the first set of geolocation based resource policies comprises a whitelist specifying that a particular core in the multi-core processor is activated in response to the multi-core processor being migrated to the first geolocation within the cloud computing environment.

18. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:
program instructions to detect that a geolocation of a computer resource has changed from an initial geolocation to a first geolocation within a cloud computing environment;
program instructions to, in response to detecting that the geolocation of the computer resource has changed from the initial geolocation to the first geolocation within the cloud computing environment, retrieve a first set of geolocation based resource policies for the first geolocation within the cloud computing environment, wherein the computer resource, when located in the initial geolocation, is controlled by an initial set of geolocation based resource policies that is different from the first set of geolocation based resource policies;
program instructions to apply a selected set of one or more geolocation based resource policies from the first set of geolocation based resource policies to alter the computer resource while in the first geolocation within the cloud computing environment;

program instructions to determine that the geolocation sensor is a fake geolocation sensor that is not registered with the managing computer; and program instructions to, in response to determining that the geolocation sensor is a fake geolocation sensor that is not registered with the managing computer, block access to the computer resource by a requesting entity.

19. A method comprising:

detecting, by a managing computer, that a geolocation of a computer resource has changed from an initial geolocation to a first geolocation within a cloud computing environment, wherein the first geolocation of the computer resource is determined by the managing computer based on location readings provided by a geolocation sensor;

in response to detecting that the geolocation of the computer resource has changed from the initial geolocation to the first geolocation within the cloud computing environment, retrieving, by the managing computer, a first set of geolocation based resource policies for the first geolocation within the cloud computing environment, wherein the computer resource, when located in the initial geolocation, is controlled by an initial set of geolocation based resource policies that is different from the first set of geolocation based resource policies;

applying, by the managing computer, a selected set of one or more geolocation based resource policies from the first set of geolocation based resource policies to alter the computer resource while in the first geolocation within the cloud computing environment;

determining, by the managing computer, that the geolocation sensor is a fake geolocation sensor that is indicating that the computer resource is at the initial geolocation; and in response to determining that the fake geolocation sensor is indicating that the computer resource is at the initial geolocation, determining, by the managing computer, that the computer resource is at the first geolocation.

20. A computer program product comprising one or more computer readable storage mediums, and program instructions stored on at least one of the one or more computer readable storage mediums, the stored program instructions comprising:

program instructions to detect that a geolocation of a computer resource has changed from an initial geolocation to a first geolocation within a cloud computing environment, wherein the first geolocation of the computer resource is determined based on location readings provided by a geolocation sensor;

program instructions to, in response to detecting that the geolocation of the computer resource has changed from the initial geolocation to the first geolocation within the cloud computing environment, retrieve a first set of geolocation based resource policies for the first geolocation within the cloud computing environment, wherein the computer resource, when located in the initial geolocation, is controlled by an initial set of geolocation based resource policies that is different from the first set of geolocation based resource policies;

program instructions to apply a selected set of one or more geolocation based resource policies from the first set of geolocation based resource policies to alter the computer resource while in the first geolocation within the cloud computing environment;

program instructions to determine that the geolocation sensor is a fake geolocation sensor that is indicating that the computer resource is at the initial geolocation; and program instructions to, in response to determining that the fake geolocation sensor is indicating that the computer resource is at the initial geolocation, determine that the computer resource is at the first geolocation.

\* \* \* \* \*